(12) United States Patent
Lin et al.

(10) Patent No.: US 7,641,352 B2
(45) Date of Patent: *Jan. 5, 2010

(54) LED BACKLIGHT DEVICE WITH DEVIATED LED PITCH

(75) Inventors: Yu Kai Lin, Yunlin County (TW);
Chung Peng, Taichung (TW);
Chih-Kuang Chen, Kaohsiung (TW);
Shin-Chin Tseng, Taichung (TW);
Shen-Hong Chou, Kaohsiung (TW)

(73) Assignee: Au Optronics Corporation, Hsinchu (TW)

( * ) Notice: Subject to any disclaimer, the term of this patent is extended or adjusted under 35 U.S.C. 154(b) by 1 day.

This patent is subject to a terminal disclaimer.

(21) Appl. No.: 11/522,214

(22) Filed: Sep. 14, 2006

(65) Prior Publication Data

US 2008/0068861 A1    Mar. 20, 2008

(51) Int. Cl.
G09F 13/04    (2006.01)
(52) U.S. Cl. .................. 362/97.3; 362/330; 362/612
(58) Field of Classification Search .................. 362/30,
362/612, 613, 330, 97, 29, 800; 349/61–64
See application file for complete search history.

(56) References Cited

U.S. PATENT DOCUMENTS

| 5,164,715 | A | * | 11/1992 | Kashiwabara et al. ......... 345/4 |
| 5,479,275 | A | * | 12/1995 | Abileah ........................... 349/5 |
| 5,803,579 | A | * | 9/1998 | Turnbull et al. ............. 362/516 |
| 6,785,475 | B2 | | 8/2004 | Lo |
| 6,923,548 | B2 | | 8/2005 | Lim |
| 6,979,102 | B2 | * | 12/2005 | You .............................. 362/218 |
| 7,052,152 | B2 | * | 5/2006 | Harbers et al. ................ 362/30 |
| 7,159,999 | B2 | * | 1/2007 | Yoo et al. .................... 362/249 |
| 2006/0002107 | A1 | * | 1/2006 | Jeong ......................... 362/225 |
| 2006/0012989 | A1 | * | 1/2006 | Lee ............................. 362/231 |
| 2006/0056201 | A1 | * | 3/2006 | Chang et al. ................ 362/631 |
| 2006/0087827 | A1 | * | 4/2006 | Jung et al. ..................... 362/29 |
| 2006/0087866 | A1 | * | 4/2006 | Ng et al. ...................... 362/612 |
| 2006/0262555 | A1 | * | 11/2006 | Yi et al. ....................... 362/561 |
| 2006/0290620 | A1 | * | 12/2006 | Chou et al. ................... 345/82 |
| 2007/0291485 | A1 | * | 12/2007 | Peng et al. ................... 362/240 |

FOREIGN PATENT DOCUMENTS

CN    1713055 A    12/2005

* cited by examiner

*Primary Examiner*—Gunyoung T Lee
(74) *Attorney, Agent, or Firm*—Morris, Manning & Martin LLP; Tim Tingkang Xia

(57) ABSTRACT

A backlight unit usable in a liquid crystal display. In one embodiment, the backlight unit includes a substrate, a first plurality of light emitting elements positioned on the substrate, and a second plurality of light emitting elements positioned on the substrate, where the first plurality of light emitting elements positioned on the substrate are arranged in rows, such that two neighboring rows define a first pitch therebetween and the second plurality of light emitting elements positioned on the substrate are arranged in a row such that the row of the second plurality of light emitting elements is separated from the closest neighboring row of the first plurality of light emitting elements by a second pitch, where the first pitch is less than the second pitch.

30 Claims, 5 Drawing Sheets

LED BACKLIGHT DEVICE WITH DEVIATED LED PITCH

FIELD OF THE INVENTION

The present invention relates generally to a backlight usable in a display device, and more particularly, to a light emitting diode (LED) backlight unit with deviated LED pitch usable in a display device.

BACKGROUND OF THE INVENTION

Liquid crystal displays (LCDs) are commonly used as display devices for compact electronic apparatuses because of their capability of displaying images with good quality while using little power. However, the liquid crystals in an LCD do not emit any light themselves. The liquid crystals have to be lit up by a light source so as to clearly and sharply display text and images. Usually, a backlight device is employed as such a light source.

Typically, a backlight device comprises a plurality of light emitting diodes (LEDs), which are arranged in the form of a matrix. FIG. 7 shows a conventional LED backlight device 700, where a plurality of LEDs 710 are arranged along a row direction 770 and a column direction 772 such that any two adjacent rows have an identical pitch, $P_{row}$, therebetween and any two adjacent columns have an identical pitch, $P_{col}$, therebetween. Such an arrangement of the backlight device needs more LEDs, thereby increasing the cost of the backlight device. Simply reducing the number of LEDs, however, is not a solution because it may affect the uniformity of the light.

Therefore, a heretofore unaddressed need exists in the art to address the aforementioned deficiencies and inadequacies.

SUMMARY OF THE INVENTION

The present invention, in one aspect, relates to a backlight unit usable in a liquid crystal display. In one embodiment, the backlight unit comprises a substrate. The substrate is formed with a first edge, a second edge, a third edge and a fourth edge, and wherein the first edge is opposite to the second edge, the third edge is opposite to the fourth edge, and the first edge is connected to the third edge.

The backlight unit further comprises a first plurality of light emitting elements positioned on the substrate and arranged in a plurality of rows such that two neighboring rows define a first pitch therebetween, and a second plurality of light emitting elements positioned on the substrate and arranged in a row such that the row of the second plurality of light emitting elements is separated from the closest neighboring row of the first plurality of light emitting elements by a second pitch. The second pitch is greater than the first pitch. Additionally, the row of the second plurality of light emitting elements is positioned between its closest neighboring row of the first plurality of light emitting elements and the first edge of the substrate.

Furthermore, the backlight unit comprises a third plurality of light emitting elements positioned on the substrate and arranged in a row, where the row of the third plurality of light emitting elements is positioned between its closest neighboring row of the first plurality of light emitting elements and the second edge of the substrate. The row of the third plurality of light emitting elements is separated from the closest neighboring row of the first plurality of light emitting elements by a third pitch. The third pitch is greater than the first pitch. The row of the second plurality of light emitting elements and the first edge of the substrate define a first distance therebetween, and the row of the third plurality of light emitting elements and the second edge of the substrate define a second distance therebetween. In one embodiment, the first distance is less than the second pitch, and the second distance is less than the third pitch.

Moreover, the backlight unit comprises a fourth plurality of light emitting elements positioned on the substrate and arranged in a first column and a second column, where the first column of the fourth plurality of light emitting elements is positioned between its closest neighboring column of the first plurality of light emitting elements and the third edge of the substrate, and the second column of the fourth plurality of light emitting elements is positioned between its closest neighboring column of the first plurality of light emitting elements and the fourth edge of the substrate. In one embodiment, the first column of the fourth plurality of light emitting elements is separated from the closest neighboring column of the first plurality of light emitting elements by a fourth pitch, and the second column of the fourth plurality of light emitting elements is separated from the closest neighboring column of the first plurality of light emitting elements by a fifth pitch. Each of the fourth pitch and the fifth pitch is greater than the first pitch, but less than three times of the first pitch. In one embodiment, the first column of the fourth plurality of light emitting elements and the third edge of the substrate define a third distance therebetween, and the second column of the fourth plurality of light emitting elements and the fourth edge of the substrate define a fourth distance therebetween. The third distance is less than the fourth pitch, and the fourth distance is less than the fifth pitch, respectively.

In one embodiment, each of the first plurality of light emitting elements, the second plurality of light emitting elements, the third plurality of light emitting elements and the fourth plurality of light emitting elements comprises at least three LED chips. The at least three LED chips comprise at least a first LED chip capable of emitting light in a red color, a second LED chip capable of emitting light in a blue color, and a third LED chip capable of emitting light in a green color. In another embodiment, each of the first plurality of light emitting elements, the second plurality of light emitting elements, the third plurality of light emitting elements, and the fourth plurality of light emitting elements comprises a LED chip capable of emitting light in a white color.

In another aspect, the present invention relates to a backlight unit for use in a liquid crystal display. In one embodiment, the backlight unit includes a substrate having a first zone and a second zone; a first plurality of light emitting elements positioned in the first zone of the substrate and arranged in a plurality of rows, where two neighboring rows define a first pitch therebetween; and a second plurality of light emitting elements positioned in the second zone of the substrate, where the first zone and the second zone are at least partially separated by a second pitch. The second pitch is greater than the first pitch. The second plurality of light emitting elements are arranged in at least one row, substantially parallel to an edge of the substrate and separated by a distance therebetween, and wherein the distance is less than the second pitch. In one embodiment, the distance is less than 1 mm.

In one embodiment, each of the first plurality of light emitting elements and the second plurality of light emitting elements comprises at least three LED chips, where the at least three LED chips comprise at least a first LED chip capable of emitting light in a red color, a second LED chip capable of emitting light in a blue color, and a third LED chip capable of emitting light in a green color. In another embodiment, each of the first plurality of light emitting elements and the second plurality of light emitting elements comprises a LED chip capable of emitting light in a white color.

In yet another aspect, the present invention relates to a light emitting diode (LED) package structure for use in a liquid crystal display. In one embodiment, the LED package structure comprises a substrate; a first plurality of light emitting elements positioned on the substrate and arranged in a plurality of columns such that two neighboring columns define a first pitch therebetween; a second plurality of light emitting elements positioned on the substrate and arranged in a column such that the column of the second plurality of light emitting elements is separated from the closest neighboring column of the first plurality of light emitting elements by a second pitch, where the first pitch is less than the second pitch; a sidewall formed on the edges of the substrate; and an optical film supported by the sidewall and positioned to face the first plurality of light emitting elements and the second plurality of light emitting elements.

In one embodiment, the column of the second plurality of light emitting elements is positioned adjacent to an edge of the substrate, and defines a distance therebetween, and wherein the distance is less than the second pitch, where the distance is less than 1 mm. The column of the second plurality of light emitting elements is positioned between its closest neighboring column of the first plurality of light emitting elements and the sidewall. The sidewall comprises a white sheet.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION OF THE INVENTION

Figure 1:
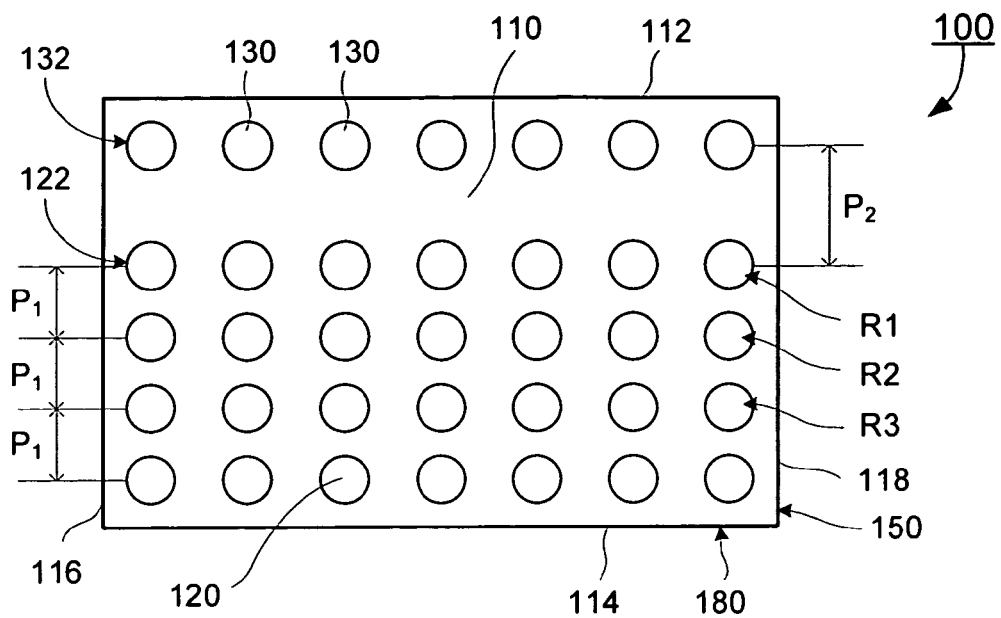
FIG. 1 partially shows schematically an LED backlight unit according to one embodiment of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

The description will be made as to the embodiments of the present invention in conjunction with the accompanying drawings in FIGS. 1-6. In accordance with the purposes of this invention, as embodied and broadly described herein, this invention, in one aspect, relates to a backlight unit usable in a liquid crystal display.

Referring to FIG. 1, a backlight unit 100 is partially shown according to one embodiment of the present invention, which includes a substrate 110, a first plurality of light emitting elements 120 positioned on the substrate 110, and a second plurality of light emitting elements 130 positioned on the substrate 110. The substrate 110 is formed in a rectangle having a first edge 112, a second, opposite edge 114, a third edge 116 and a fourth, opposite edge 118, and wherein the first edge 112 and the second, opposite edge 114 are substantially parallel to each other, the third edge 116 and the fourth, opposite edge 118 are substantially parallel to each other, and the first edge 112 and the third edge 116 are substantially perpendicular to each other. The substrate can also be formed in other geometries.

The first plurality of light emitting elements 120 positioned on the substrate 110 are arranged in rows $\{R_i\}$, i=1, 2, 3, . . . , N, N being an integer greater than one, such that any two neighboring rows define a substantially uniform pitch, $P_1$, therebetween. Unless otherwise indicated, the pitch between any two neighboring rows (or columns) is defined from a center axis of one of the two neighboring rows (or columns) to a parallel, center axis of another of the two neighboring rows (or columns).

The second plurality of light emitting elements 130 positioned on the substrate 110 are arranged in a row 132 such that the row 132 of the second plurality of light emitting elements 130 and its closest neighboring row 122 of the first plurality of light emitting elements 120 define a pitch, $P_2$, therebetween. The row 132 of the second plurality of light emitting elements 130 is positioned between its closest neighboring row 122 of the first plurality of light emitting elements 120 and an edge 112 of the substrate 110, which is substantially parallel to the row 132 of the second plurality of light emitting elements 130. In one embodiment, $P_1$ and $P_2$ satisfy the relationship of: $P_1<P_2<3 P_1$. Preferably, $P_1$ and $P_2$ satisfy the relationship of: $P_1<P_2<2P_1$.

Each of the first plurality of light emitting elements 120 and the second plurality of light emitting elements 130 comprises one or more or at least three LED chips, where each LED chip is capable of emitting light. In one embodiment, the one LED chip is capable of emitting light in a white color. In another embodiment, the at least three LED chips includes at least a first LED chip capable of emitting light in a red color, a second LED chip capable of emitting light in a blue color, and a third LED chip capable of emitting light in a green color, so that each of the first plurality of light emitting elements 120 and the second plurality of light emitting elements 130 is capable of emitting light in a white color. In alternative embodiment, the at least three LED chips may include at least one LED chip capable of emitting light in one color selected from the group of a red color, a blue color, a green color, a brown color, a yellow color, a pink color, a violet color, an indigo color, a reddish orange color, an orange color, a cyan color, a salmon pink color, a mauve color and a white color. The LED chips are corresponding to top-emitting LEDs.

The first plurality of light emitting elements 120 and the second plurality of light emitting elements 130 can be substantially identical or different.

Furthermore, the backlight unit 100 includes a sidewall 150 formed on the edges 112, 114, 116 and 118 of the substrate 110. The sidewall 150 can be a white sheet that is made of a material that is capable of diffusedly reflecting light emitting from the first and second pluralities of LEDs 120 and 130 positioned on the substrate 110, thereby ensuring the uniformity of the light of the backlight unit 100 even the back light unit 100 uses a reduced number of LEDs than a conventional backlight unit does. Compared with the conventional backlight unit 700 shown in FIG. 7, for example, for the same sized backlight unit, the invented backlight unit 100 uses fewer LEDs.

Figure 2:
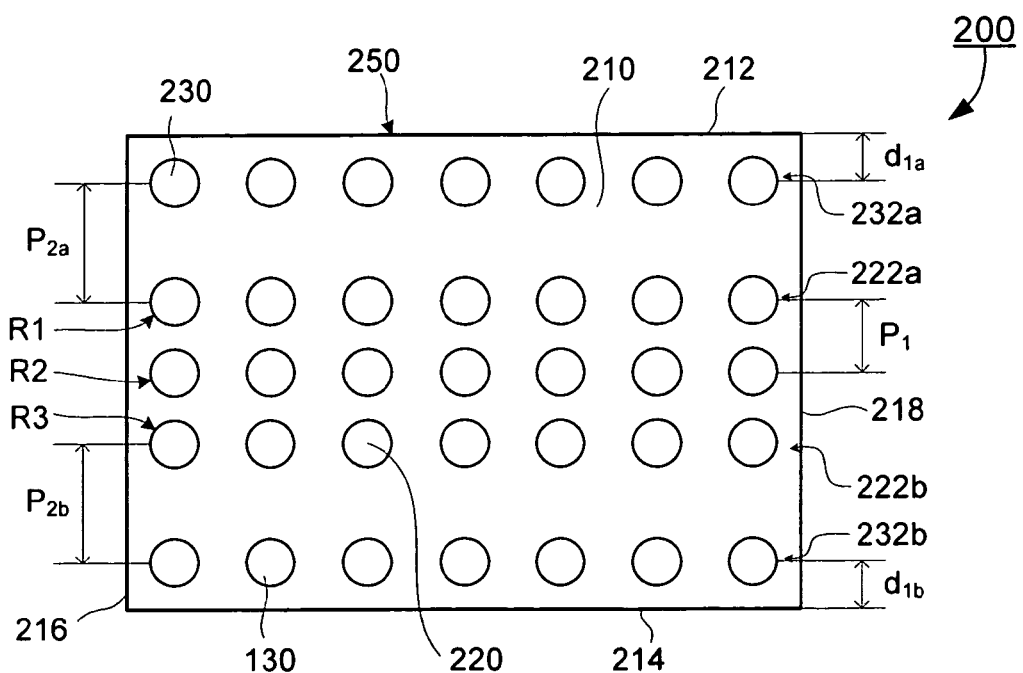
FIG. 2 partially shows schematically an LED backlight unit according to another embodiment of the present invention.

Referring to FIG. 2, a backlight unit 200 is partially shown according to another embodiment of the present invention. The backlight unit 200 has a substrate 210, a first plurality of light emitting elements 220 positioned on the substrate 210, and a second plurality of light emitting elements 230 positioned on the substrate 210. The substrate 210 is formed in a rectangle having a first edge 212, a second, opposite edge 214, a third edge 216 and a fourth, opposite edge 218, wherein the first edge 212 and the second, opposite edge 214 are substantially parallel to each other, the third edge 216 and the fourth, opposite edge 218 are substantially parallel to each other, and the first edge 212 and the third edge 216 are substantially perpendicular to each other.

The first plurality of light emitting elements 220 positioned on the substrate 210 are arranged in rows $\{R_i\}$, i=1, 2, 3, . . . , N, N being an integer greater than one, such that any two neighboring rows define a substantially uniform pitch, $P_1$, therebetween.

The second plurality of light emitting elements 230 positioned on the substrate 210 are arranged in two rows 232a, 232b, where a first row 232a is positioned between its closest neighboring row 222a of the first plurality of light emitting elements 220 and the first edge 212 of the substrate 210, and a second row 232b is positioned between its closest neighboring row 222b of the first plurality of light emitting elements 20 and the second edge 214 of the substrate 210, respectively. The first row 232a and its closest neighboring row 222a of the first plurality of light emitting elements 220 define a pitch, $P_{2a}$, therebetween, and the second row 232b and its closest neighboring row 222b of the first plurality of light emitting elements 220 define a pitch, $P_{2b}$, where $P_{2a}$ satisfies the relationship of $P_1<P_{2a}<3 P_1$, and $P_{2b}$ satisfies the relationship of $P_1<P_{2b}<3 P_1$, respectively. The pitch, $P_{2a}$, can be same as or different from the pitch, $P_{2b}$. Furthermore, the first row 232a and the first edge 212 of the substrate 210 define a distance, $d_{1a}$, therebetween, and the second row 232b and the second edge 214 of the substrate define a distance, $d_{1b}$, therebetween, where $d_{1a}$ satisfies the relationship of $d_{1a}<P_{2a}$, and $d_{1b}$ satisfies the relationship of $d_{1b}<P_{2b}$, respectively, and where the distance, $d_{1a}$, can be same as or different from the distance, $d_{1b}$. In one embodiment, each of the distances $d_{1a}$ and $d_{1b}$ is less than 1 mm.

Additionally, the backlight unit 200 includes a sidewall 250 formed on the edges 212, 214, 216 and 218 of the substrate 210. The sidewall 250 includes a white sheet and is adapted for diffusedly reflecting light emitting from the first and second pluralities of LEDs 220 and 230 positioned on the substrate 210, so as to make the light of the backlight unit 200 uniformly distributed.

Figure 3:
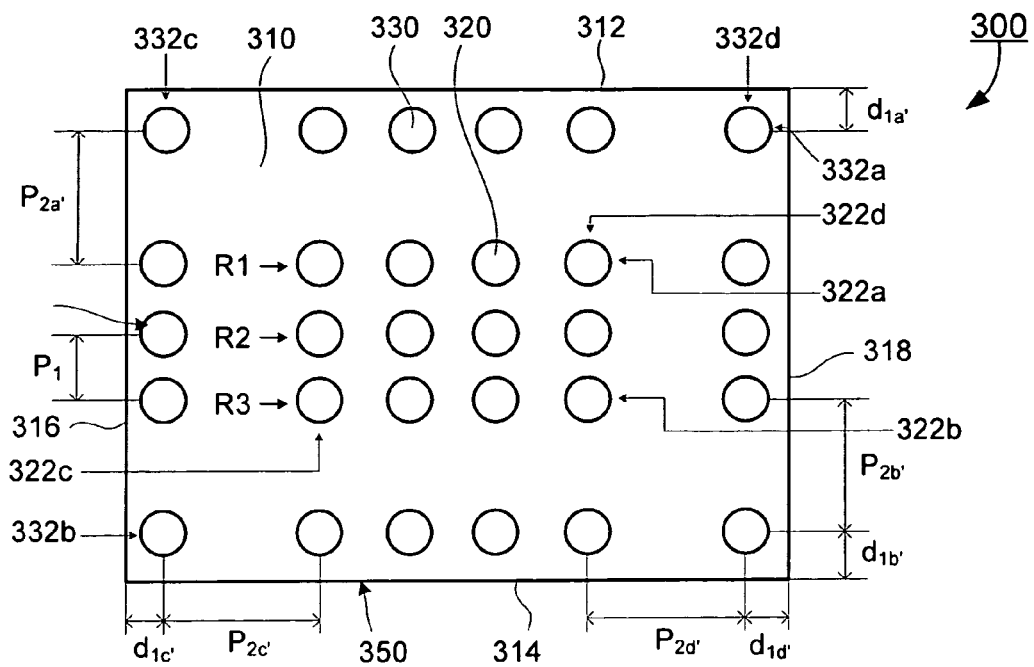
FIG. 3 partially shows schematically an LED backlight unit according to an alternative embodiment of the present invention.

Referring to FIG. 3, a backlight unit 300 according to an alternative embodiment of the present invention is partially shown. The backlight unit 300 has a substrate 310, a first plurality of light emitting elements 320 positioned on the substrate 310, and a second plurality of light emitting elements 330 positioned on the substrate 310. The substrate 310 is formed in a rectangle having a first edge 312, a second, opposite edge 314, a third edge 316 and a fourth, opposite edge 318, where the first edge 312 and the second, opposite edge 314 are substantially parallel to each other, the third edge 316 and the fourth, opposite edge 318 are substantially parallel to each other, and the first edge 312 and the third edge 316 are substantially perpendicular to each other. The substrate can also be formed in other geometries.

The first plurality of light emitting elements 320 positioned on the substrate 310 are arranged in rows $\{R_i\}$, i=1, 2, 3, . . . , N, N being an integer greater than one, such that any two neighboring rows define a substantially uniform pitch, $P_1$, therebetween.

The second plurality of light emitting elements 330 positioned on the substrate 310 are arranged in two rows 332a and 332b, and two columns 332c and 332d, wherein a first row 332a is positioned between its closest neighboring row 322a of the first plurality of light emitting elements 320 and the first edge 312 of the substrate 310, a second row 332b is positioned between its closest neighboring row 322b of the first plurality of light emitting elements 320 and the second edge 314 of the substrate 310, a first column 332c is positioned between its closest neighboring column 322c of the first plurality of light emitting elements 320 and the third edge 316 of the substrate 310, a second column 332d is positioned between its closest neighboring column 322d of the first plurality of light emitting elements 320 and the fourth edge 318 of the substrate 310.

The first row 332a and its closest neighboring row 322a of the first plurality of light emitting elements 320 define a pitch, $P_{2a'}$, therebetween, and the second row 332b and its closest neighboring row 322b of the first plurality of light emitting elements 320 define a pitch, $P_{2b'}$, and wherein $P_{2a'}$ satisfies the relationship of $P_1<P_{2a'}<3 P_1$, and $P_{2b'}$ satisfies the relationship of $P_1<P_{2b'}<3 P_1$, respectively, wherein the pitch, $P_{2a'}$, can be same as or different from the pitch, $P_{2b'}$. Furthermore, the first row 332a and the first edge 312 of the substrate 310 define a distance, $d_{1a'}$, therebetween, and the second row 332b and the second edge 314 of the substrate 310 define a distance, $d_{1b'}$, therebetween, wherein $d_{1a'}$ satisfies the relationship of $d_{1a'}<P_{2a'}$, and $d_{1b'}$ satisfies the relationship of $d_{1b'}<P_{2b'}$, respectively, and wherein the distance, $d_{1a'}$, can be same as or different from the distance, $d_{1b'}$.

The first column 332c and its closest neighboring column 322c of the first plurality of light emitting elements 320 define a pitch, $P_{2c'}$, therebetween, and the second column 332d and its closest neighboring column 322d of the first plurality of light emitting elements 320 define a pitch, $P_{2d'}$, wherein $P_{2c'}$ satisfies the relationship of $P_1<P_{2c'}<3 P_1$, and $P_{2d'}$ satisfies the relationship of $P_1<P_{2d'}<3 P_1$, respectively, and wherein the pitch, $P_{2c'}$, can be same as or different from the pitch, $P_{2d'}$. Additionally, the first column 332c and the third edge 316 of the substrate 310 define a distance, $d_{1c'}$, therebetween, and the second column 332d and the fourth edge 318 of the substrate define a distance, $d_{1d'}$, therebetween, wherein $d_{1c'}$ satisfies the relationship of $d_{1c'}<P_{2c'}$, and $d_{1d'}$ satisfies the relationship of $d_{1d'}<P_{2d'}$, respectively, and wherein the distance, $d_{1c'}$, can be same as or different from the distance, $d_{1d'}$.

Furthermore, the backlight unit 300 includes a sidewall 350 formed on the edges 312, 314, 316 and 318 of the substrate 310. The sidewall 350 has a white sheet that is made of a material that is capable of diffusely reflecting light emitting from the first and second pluralities of LEDs 320 and 330 positioned on the substrate 310, thereby ensuring the uniformity of the light of the backlight unit 300.

Figure 4:
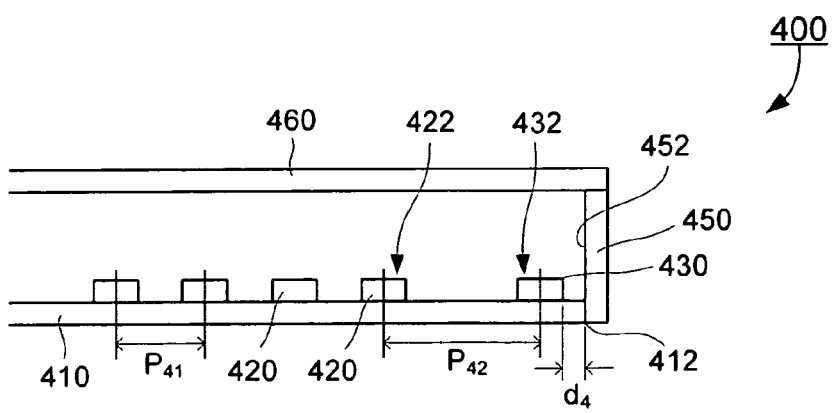
FIG. 4 partially shows schematically an LED package structure in cross-section according to one embodiment of the present invention.

Referring to FIG. 4, a light emitting diode (LED) package structure 400 is shown according to one embodiment of the present invention. The LED package structure 400 is usable in an LCD. The LED package structure 400 has a substrate 410, a first plurality of light emitting elements 420 positioned on the substrate 410, a second plurality of light emitting elements 430 positioned on the substrate 410, a sidewall 450 formed on the edges of the substrate 410, and an optical film 460 supported by the sidewall 450 and positioned to face the first plurality of light emitting elements 420 and the second plurality of light emitting elements 430.

The sidewall 450 has a white sheet 452 that is made of a material that is capable of diffusely reflecting light emitting from the first and second pluralities of light emitting elements 420 and 430 positioned on the substrate 410, respectively. The first plurality of light emitting elements 420 positioned on the substrate 410 are arranged in columns $\{R_j\}$, j=1, 2, 3, ..., N, N being an integer greater than one, such that any two neighboring columns define a substantially uniform pitch, $P_{41}$, therebetween.

The second plurality of light emitting elements 430 positioned on the substrate 410 are arranged in a column 432 such that the column 432 of the second plurality of light emitting elements 430 and its closest neighboring column 422 of the first plurality of light emitting elements 420 define a pitch, $P_{42}$, therebetween, where $P_{41}$ and $P_{42}$ satisfy the relationship of $P_{41}<P_{42}<3 P_{41}$, preferably, $P_4$, and $P_{42}$ further satisfy the relationship of $P_{41}<P_{42}\leq 2P_{41}$.

The column 432 of the second plurality of light emitting elements 430 is positioned between its closest neighboring column 422 of the first plurality of light emitting elements 420 and an edge 412 of the substrate 410, which is substantially parallel to the column 432 of the second plurality of light emitting elements 430. The column 432 of the second plurality of light emitting elements 430 and the edge 412 of the substrate 410 define a distance, $d_4$, therebetween, wherein $d_4$ satisfies the relationship of $d_4<P_{42}$, and wherein $d_4$ further satisfies the relationship of $d_4<1$ mm.

Figure 5:
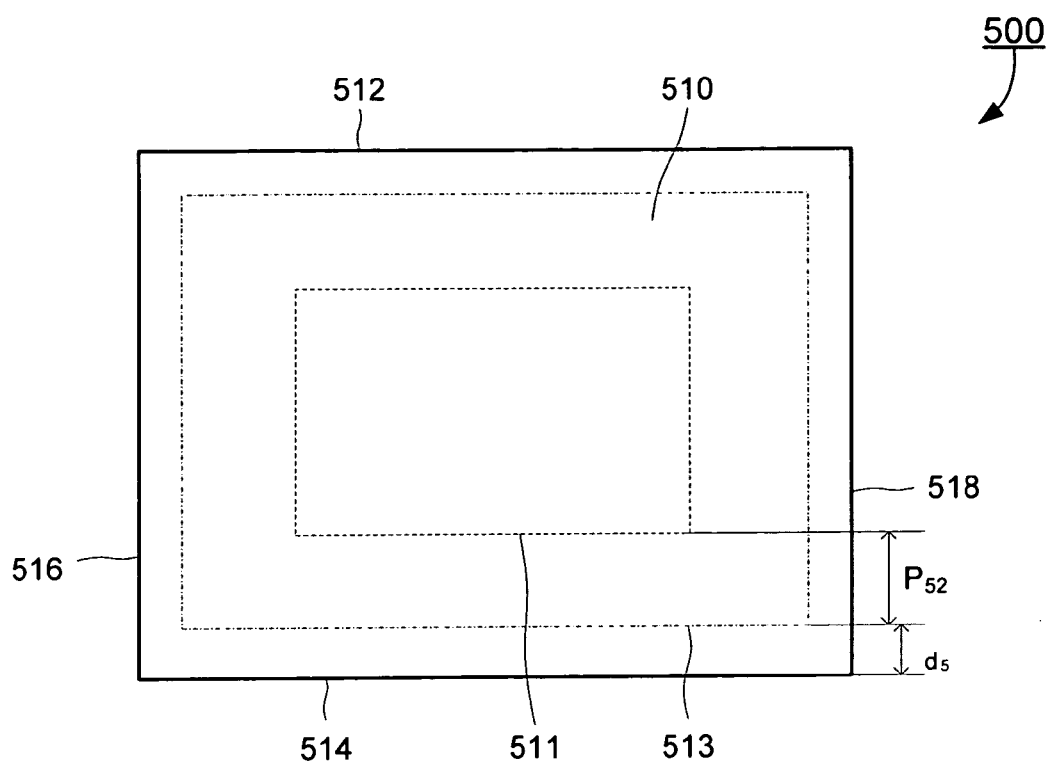
FIG. 5 partially shows schematically an LED backlight unit according to one embodiment of the present invention.

FIG. 5 partially shows another embodiment of a backlight unit 500, which includes a substrate 510 having a first zone 511 and a second zone 513, a first plurality of light emitting elements (not shown) positioned in the first zone 511 of the substrate 510, and a second plurality of light emitting elements (not shown) positioned in the second zone 513 of the substrate 510, where the first plurality of light emitting elements positioned in the first zone 511 of the substrate 510 are arranged in rows $\{R_i\}$, i=1, 2, 3, ..., N, N being an integer greater than one, such that any two neighboring rows define a substantially uniform pitch, $P_{51}$, therebetween; the first zone 511 and the second zone 513 are at least partially separated by a distance, $P_{52}$, where $P_{51}$, and $P_{52}$ satisfy the relationship of: $P_{51}<P_{52}<3P_{51}$. Preferably, $P_{51}$ and $P_{52}$ satisfy the relationship of: $P_{51}<P_{52}\leq 2P_{51}$.

The substrate 510 is formed with a first edge 512, a second, opposite edge 514, a third edge 516 and a fourth, opposite edge 518, and wherein the first edge 512 and the second, opposite edge 514 are substantially parallel to each other, the third edge 516 and the fourth, opposite edge 518 are substantially parallel to each other, and the first edge 512 and the third edge 516 are substantially perpendicular to each other.

The second plurality of light emitting elements positioned in the second zone 513 of the substrate 510 are arranged in at least one row that is substantially parallel to one of the first edge 512, the second edge 514, the third edge 516 and the fourth edge 518. As an example shown in FIG. 5, the at least one row of the second plurality of light emitting elements is substantially parallel to the second edge 514 and defines a distance, $d_5$, therebetween, wherein $d_5$ satisfies the relationship of $d_5<P_{52}$.

Figure 6:
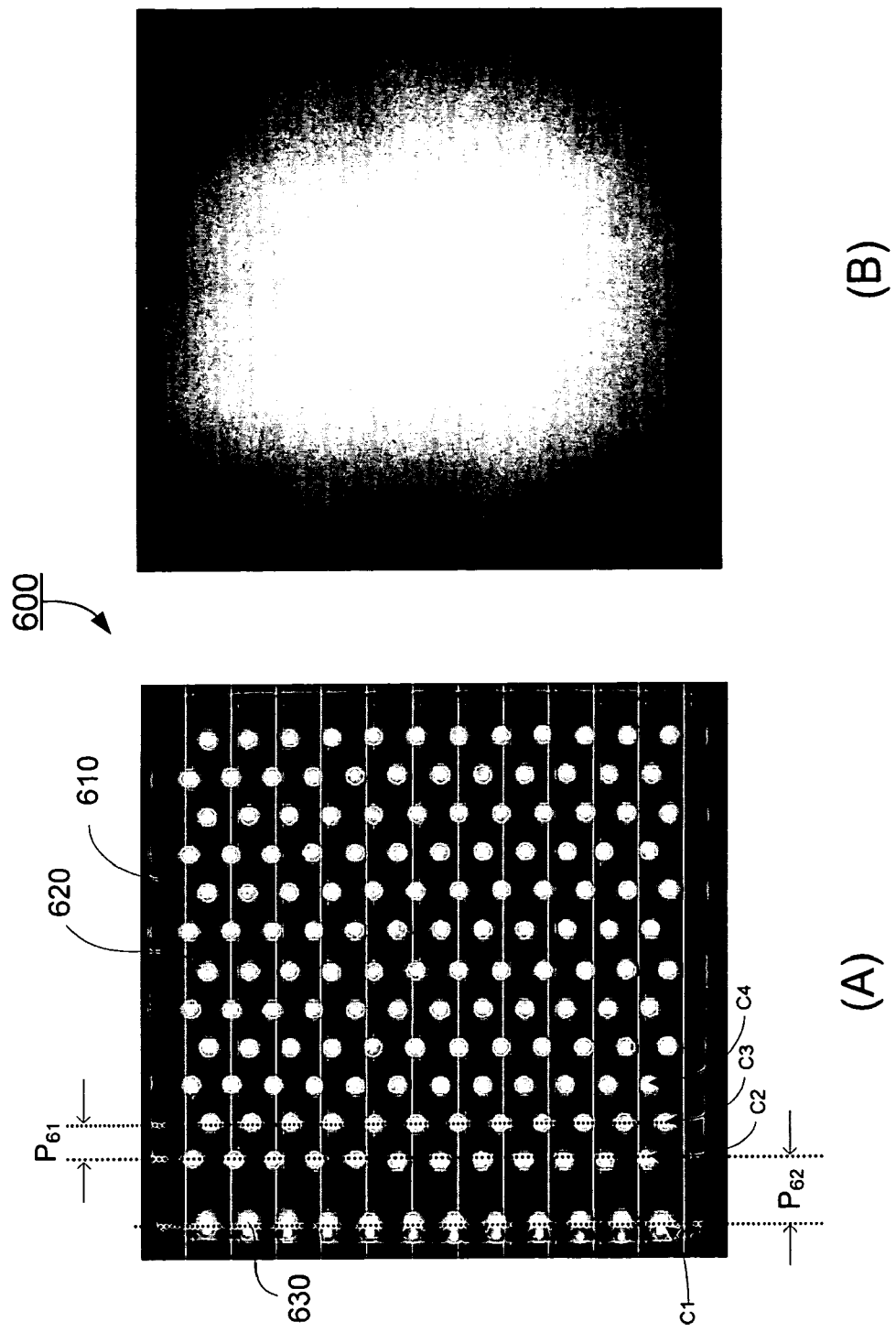
FIG. 6 shows an LED backlight unit according to one embodiment of the present invention, (A) an image of an arrangement of a plurality of LEDs without a cover film, and (B) an image of the LED backlight unit of (A) with a cover film.
Figure 7:
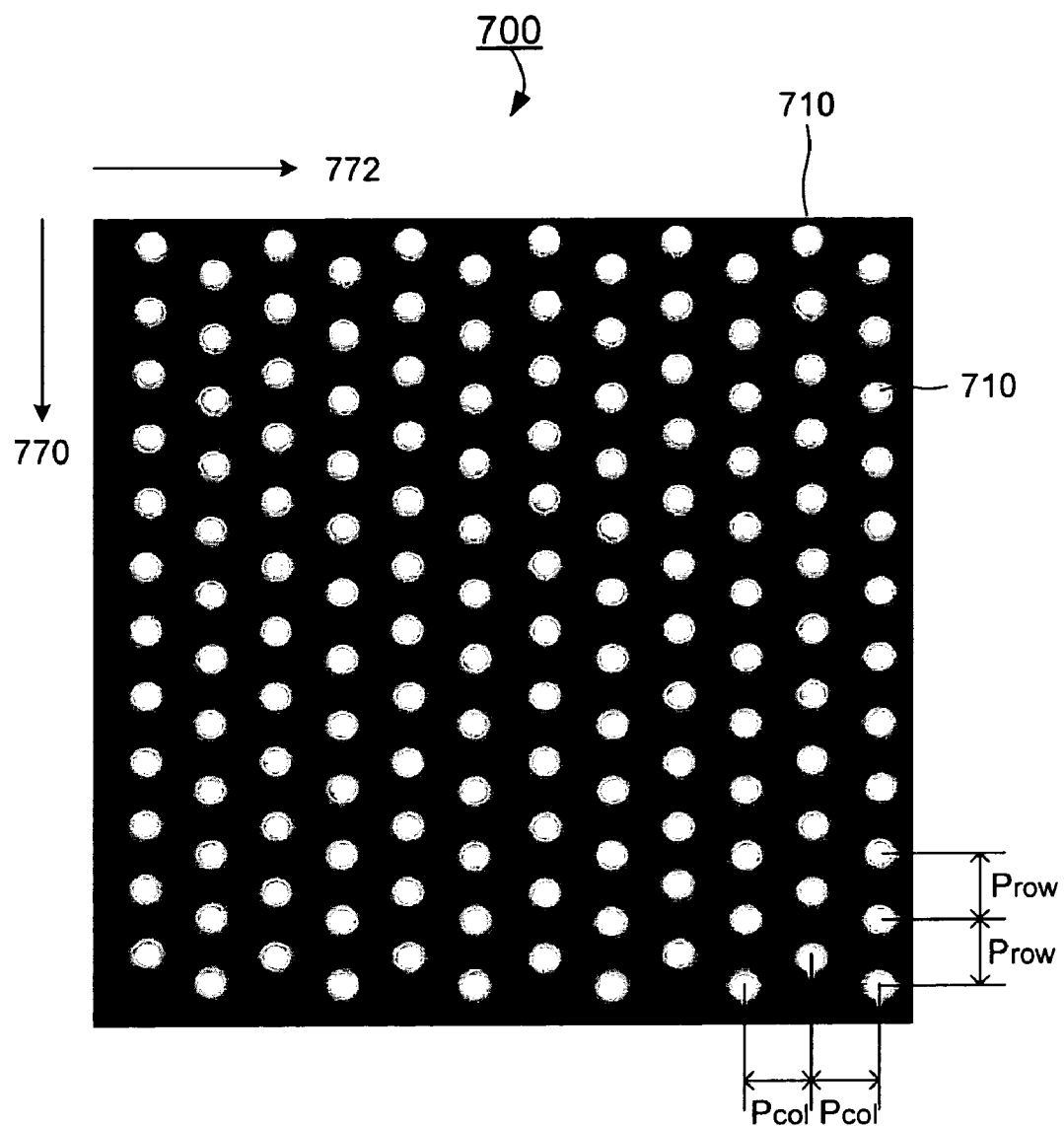
FIG. 7 shows a conventional LED backlight unit.

Referring to FIG. 6, images of a backlight unit 600 according to one embodiment of the present invention are shown, which is in principle similar to the embodiment as shown in FIG. 1. As shown in FIG. 6A, a first plurality of LEDs 620 are positioned in a substrate 610 and arranged in columns, $\{Cj\}$, j=2, 3, ..., M, M being an integer greater than one, such that any two neighboring columns define a substantially uniform pitch, $P_{61}$, therebetween. A second plurality of LEDs 630 are positioned in the substrate 610 and arranged in one column C1 such that the one row C1 of the second plurality of light emitting elements 630 and its closest neighboring row C2 of the first plurality of light emitting elements 620 define a pitch, $P_{62}$, therebetween. In the exemplary embodiment, $P_{62}=2 P_{61}$. FIG. 6B shows an image of the backlight unit 600 in operation, where uniform light emission is obtained even though the number of LEDS associated with the backlight unit 600 has been reduced in comparison with a conventional backlight unit 700 as shown in FIG. 7.

Thus, one aspect of the present invention provides a method of assembling a backlight unit 100 usable in an LCD. In one embodiment, the method comprises the steps of providing a substrate, arranging a first plurality of light emitting elements on the substrate in rows $\{R_i\}$, i=1, 2, 3, ..., N, N being an integer greater than one, such that any two neighboring rows define a substantially uniform pitch, $P_1$, therebetween, and arranging a second plurality of light emitting elements on the substrate in at least one row such that the at least one row of the second plurality of light emitting elements and its closest neighboring row of the first plurality of light emitting elements define a pitch, $P_2$, therebetween, where $P_1$ and $P_2$ satisfy the relationship of $P_1<P_2<3 P_1$. Preferably, $P_1$ and $P_2$ satisfy the relationship of $P_1<P_2\leq 2P_1$. The at least one row of the second plurality of light emitting elements is positioned between its closest neighboring row of the first plurality of light emitting elements and an edge of the substrate, which is substantially parallel to the at least one row of the second plurality of light emitting elements.

The present invention, among other things, discloses an LED backlight unit with deviated LED pitch, where LEDs in a first or central zone of the backlight unit are arranged in rows such that any two neighboring rows define substantially uniform pitch, $P_1$, therebetween, while LEDs in a second or edge zone of the backlight unit are arranged in at least one row such that the at least one row of LEDs in the edge zone and its closest neighboring row of the LEDs in the central zone define a pitch, $P_2$, therebetween. $P_1$ and $P_2$ satisfy the relationship of $P_1<P_2<3 P_1$.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated.

Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A backlight unit for use in a liquid crystal display, comprising:
    a substrate; and
    a plurality of light emitting elements mounted on the substrate and arranged in an M×N matrix form having M rows and N columns, M and N being integers that are four or greater, and comprising a first plurality of light emitting elements and a second plurality of light emitting elements,
    wherein the first plurality of light emitting elements are arranged in an (M−1)×N matrix form having (M−1) rows and N columns, such that two neighboring rows or two neighboring columns define a first pitch therebetween;
    wherein the second plurality of light emitting elements are arranged in a row such that the row of the second plurality of light emitting elements is separated from the closest neighboring row of the first plurality of light emitting elements by a second pitch and the row of the second plurality of light emitting elements is the outmost row relative to a center of the substrate; and
    wherein the first pitch is less than the second pitch.

2. The backlight unit of claim 1, wherein the first pitch is less than the second pitch and the second pitch is less than three times of the first pitch.

3. The backlight unit of claim 1, wherein the substrate is formed with a first edge, a second edge, a third edge and a fourth edge, and wherein the first edge is opposite to the second edge, the third edge is opposite to the fourth edge, and the first edge is connected to the third edge.

4. The backlight unit of claim 3, wherein the row of the second plurality of light emitting elements is positioned between the closest neighboring row of the first plurality of light emitting elements and the first edge of the substrate.

5. The backlight unit of claim 4, wherein the plurality of light emitting elements further comprises a third plurality of light emitting elements positioned on the substrate and arranged in a row, and wherein the row of the third plurality of light emitting elements is positioned between the closest neighboring row of the first plurality of light emitting elements and the second edge of the substrate.

6. The backlight unit of claim 5, wherein the row of the third plurality of light emitting elements is separated from the closest neighboring row of the first plurality of light emitting elements by a third pitch, and wherein the first pitch is less than the third pitch.

7. The backlight unit of claim 6, wherein the first pitch is less than the third pitch and the third pitch is less than three times of the first pitch.

8. The backlight unit of claim 5, wherein the row of the second plurality of light emitting elements and the first edge of the substrate define a first distance therebetween, and the row of the third plurality of light emitting elements and the second edge of the substrate define a second distance therebetween, and wherein the first distance is less than the second pitch, and the second distance is less than the third pitch.

9. The backlight unit of claim 6, wherein the plurality of light emitting elements further comprises a fourth plurality of light emitting elements positioned on the substrate and arranged in a first column and a second column, and wherein the first column of the fourth plurality of light emitting elements is positioned between the closest neighboring column of the first plurality of light emitting elements and the third edge of the substrate, and the second column of the fourth plurality of light emitting elements is positioned between the closest neighboring column of the first plurality of light emitting elements and the fourth edge of the substrate.

10. The backlight unit of claim 9, wherein the first column of the fourth plurality of light emitting elements is separated from the closest neighboring column of the first plurality of light emitting elements by a fourth pitch, and the second column of the fourth plurality of light emitting elements is separated from the closest neighboring column of the first plurality of light emitting elements by a fifth pitch, and wherein the first pitch is less than the fourth pitch, and the first pitch is less than the fifth pitch.

11. The backlight unit of claim 10, wherein the fourth pitch is less than three times of the first pitch, and the fifth pitch is less than three times of the first pitch.

12. The backlight unit of claim 10, wherein the first column of the fourth plurality of light emitting elements and the third edge of the substrate define a third distance therebetween, and the second column of the fourth plurality of light emitting elements and the fourth edge of the substrate define a fourth distance therebetween, and wherein the third distance is less than the fourth pitch, and the fourth distance is less than the fifth pitch.

13. The backlight unit of claim 9, wherein each of the first plurality of light emitting elements, the second plurality of light emitting elements, the third plurality of light emitting elements and the fourth plurality of light emitting elements comprises at least three LED chips.

14. The backlight unit of claim 13, wherein the at least three LED chips comprise at least a first LED chip adapted for emitting light in a red color, a second LED chip adapted for emitting light in a blue color, and a third LED chip adapted for emitting light in a green color.

15. The backlight unit of claim 9, wherein each of the first plurality of light emitting elements, the second plurality of light emitting elements, the third plurality of light emitting elements, and the fourth plurality of light emitting elements comprises a LED chip adapted for emitting light in a white color.

16. A backlight unit for use in a liquid crystal display, comprising:
    a substrate having a first zone and a second zone, wherein the second zone substantially encloses the first zone; and
    a plurality of light emitting elements mounted on the substrate and arranged in an M×N matrix form having M rows and N columns, M and N being integers that are four or greater, and comprising a first plurality of light emitting elements and a second plurality of light emitting elements,
    wherein the first plurality of light emitting elements are positioned uniformly within the first zone of the substrate and arranged in an (M−i)×(N−i) matrix form having (M−i) rows and (N−j) columns, i and j being even integers and $2 \leq i \leq (M-2)$ and $2 \leq j \leq (N-2)$, wherein two neighboring rows or two neighboring columns define a first pitch therebetween; and
    wherein the second plurality of light emitting elements are positioned within the second zone of the substrate, wherein the first zone and the second zone are at least partially separated by a second pitch, and the first pitch is less than the second pitch.

17. The backlight unit of claim 16, wherein the first pitch is less than the second pitch and the second pitch is less than three times of the first pitch.

18. The backlight unit of claim 16, wherein the second plurality of light emitting elements are arranged in at least one row, substantially parallel to an edge of the substrate and separated by a distance therebetween, and wherein the distance is less than the second pitch.

19. The backlight unit of claim 18, wherein the distance is less than 1 mm.

20. The backlight unit of claim 16, wherein each of the first plurality of light emitting elements and the second plurality of light emitting elements comprises at least three LED chips.

21. The backlight unit of claim 20, wherein the at least three LED chips comprise at least a first LED chip adapted for emitting light in a red color, a second LED chip adapted for emitting light in a blue color, and a third LED chip adapted for emitting light in a green color.

22. The backlight unit of claim 16, wherein each of the first plurality of light emitting elements and the second plurality of light emitting elements comprises a LED chip adapted for emitting light in a white color.

23. A light emitting diode (LED) package structure for use in a liquid crystal display, comprising:
a substrate;
a sidewall formed on the edges of the substrate; and
an optical film supported by the sidewall and positioned to face a plurality of light emitting elements,
wherein the plurality of light emitting elements mounted on the substrate and arranged in an M×N matrix form having M rows and N columns, M and N being integers that are four or greater, and comprises a first plurality of light emitting elements and a second plurality of light emitting elements;
wherein the first plurality of light emitting elements are arranged in an M×(N−1) matrix form having M rows and (N−1) columns, such that two neighboring row or two neighboring columns define a first pitch therebetween; and
wherein the second plurality of light emitting elements are arranged in a column such that the column of the second plurality of light emitting elements is separated from the closest neighboring column of the first plurality of light emitting elements by a second pitch and the column of the second plurality of light emitting elements is the outmost column relative to a center of the substrate, wherein the first pitch is less than the second pitch.

24. The LED package structure of claim 23, wherein the first pitch is less than the second pitch and the second pitch is less than three times of the first pitch.

25. The LED package structure of claim 23, wherein the column of the second plurality of light emitting elements is positioned adjacent to an edge of the substrate, and defines a distance therebetween, and wherein the distance is less than the second pitch.

26. The LED package structure of claim 25, wherein the distance is less than 1 mm.

27. The LED package structure of claim 23, wherein the column of the second plurality of light emitting elements is positioned between the closest neighboring column of the first plurality of light emitting elements and the sidewall.

28. The LED package structure of claim 23, wherein the sidewall comprises a white sheet.

29. The LED package structure of claim 23, wherein each of the first plurality of light emitting elements and the second plurality of light emitting elements comprises at least three LED chips including at least a first LED chip adapted for emitting light in a red color, a second LED chip adapted for emitting light in a blue color, and a third LED chip adapted for emitting light in a green color.

30. The backlight unit of claim 23, wherein each of the first plurality of light emitting elements and the second plurality of light emitting elements comprises a LED chip adapted for emitting light in a white color.

* * * * *